US012759030B2

(12) United States Patent
Ebadian et al.

(10) Patent No.: US 12,759,030 B2
(45) Date of Patent: Oct. 13, 2026

(54) ELECTRONIC DATA DISINTEGRATOR

(71) Applicant: Phiston Technologies, Inc., Miramar, FL (US)

(72) Inventors: M. Ali Ebadian, Weston, FL (US); Raul Travieso, Hollywood, FL (US)

(73) Assignee: Phiston Technologies, Inc., Miramar, FL (US)

(*) Notice: Subject to any disclaimer, the term of this patent is extended or adjusted under 35 U.S.C. 154(b) by 204 days.

(21) Appl. No.: 18/910,467

(22) Filed: Oct. 9, 2024

(65) Prior Publication Data

US 2026/0097425 A1 Apr. 9, 2026

(51) Int. Cl.
*B09B 3/35* (2022.01)
*B09B 3/80* (2022.01)
*B09B 101/18* (2022.01)

(52) U.S. Cl.
CPC .................. *B09B 3/35* (2022.01); *B09B 3/80* (2022.01); *B09B 2101/18* (2022.01)

(58) Field of Classification Search
CPC .... B02C 2018/0015; B02C 2018/0038; B02C 18/18; B02C 18/142; B02C 18/24; B09B 3/35; B09B 3/80; B09B 2101/18; B09B 2101/17
See application file for complete search history.

(56) References Cited

U.S. PATENT DOCUMENTS

| | | | | |
|---|---|---|---|---|
| 5,395,057 | A * | 3/1995 | Williams, Jr. | B02C 18/142 241/285.2 |
| 7,324,321 | B2 | 1/2008 | Olliges | |
| 7,852,590 | B1 | 12/2010 | Olliges | |
| 8,064,183 | B2 | 11/2011 | Olliges | |
| 8,794,559 | B1 | 8/2014 | Olliges et al. | |
| 9,776,192 | B2 | 10/2017 | Ebadian et al. | |
| 10,071,382 | B1 | 9/2018 | Ebadian et al. | |
| 10,242,699 | B1 | 3/2019 | Ebadian et al. | |
| 10,657,345 | B1 | 5/2020 | Ebadian et al. | |
| 11,267,647 | B2 | 3/2022 | Ebadian et al. | |
| 11,389,805 | B1 * | 7/2022 | Ebadian | B02C 19/0056 |
| 11,400,457 | B2 | 8/2022 | Ebadian et al. | |
| 2003/0089806 | A1 * | 5/2003 | Galanty | B02C 18/0092 241/46.06 |
| 2014/0238189 | A1 * | 8/2014 | Matosevic | B02C 15/006 74/665 A |
| 2023/0234070 | A1 * | 7/2023 | Burhorst | B02C 18/0092 |

FOREIGN PATENT DOCUMENTS

| | | | | |
|---|---|---|---|---|
| CN | 118595129 | A * | 9/2024 | B02C 18/24 |

OTHER PUBLICATIONS

English translate (CN118595129A), retrieved date Jun. 23, 2026.*

* cited by examiner

*Primary Examiner* — Mohammed S. Alawadi
(74) *Attorney, Agent, or Firm* — McHale & Slavin, P.A.

(57) ABSTRACT

An electronic data destruction device specifically designed to destroy data on hard disk drives (HDD), heat resistant magnetic recording (HAMR), microwave assisted magnetic recording (MAMR), perpendicular magnetic recording (PMR), solid state drives (SSD), and the like devices used for storage of data.

18 Claims, 18 Drawing Sheets

ELECTRONIC DATA DISINTEGRATOR

FIELD OF THE INVENTION

This invention is related to the field of electronic data destruction and, in particular, to an apparatus for destroying tablets, HDDs and SSDs.

BACKGROUND OF THE INVENTION

Sensitive information is commonly stored on hard disk drives "HDD", solid state drives "SSD", and the like devices capable of electronic data storage. When equipment is to be decommissioned, it is critical that all electronic data remaining on the decommissioned equipment is destroyed so it cannot be recovered by competitors or foreign agents. Loss of sensitive date can result in theft of a business or government most valuable trade secrets resulting in a loss of a business advantage over a competitor, or tactical information regarding a government. While loss of personal data can result in identity theft, loss of sensitive government data can be catastrophic. No matter how trivial the theft may appear, the resulting harm can be irreparable mandating that electronic data is properly disposed of when no longer needed.

When the life of a data storage device such as an HDD or SDD is expired, ideally the item housing the storage unit is physically destroyed to assure that any stored data cannot be retrieved. The goal being to assure that any sensitive material on the disk has been rendered unreachable and unusable. Various data destroying apparatus are described in Applicant's prior patents including U.S. Pat. No. 7,324,321 for a Degaussing Apparatus; U.S. Pat. No. 7,852,590 for a Solid State Memory Decommissioner; U.S. Pat. No. 8,064,183 for a Capacitor Based Bi-Directional Degaussing Apparatus; U.S. Pat. No. 8,794,559 for a Solid State Storage Device Crusher; U.S. Pat. No. 9,776,192 for a Comminuting Apparatus; U.S. Pat. No. 10,071,382 for a Solid State Drive Disintegrator; U.S. Pat. No. 10,242,699 for a Single Pulse Degaussing Device; U.S. Pat. No. 10,657,345 for a Media Destruction Verification Apparatus; U.S. Pat. No. 11,400,457 for a Solid State Drive Media Destroyer; and U.S. Pat. No. 11,267,647 for a Security Bin.

What is desired is a combo apparatus specifically designed to destroy HDD and SDD storage devices in to particle size less than 20 mm×20 mm.

SUMMARY OF THE INVENTION

Disclosed is an electronic data destruction device specifically designed to destroy data on hard disk drives (HDD), heat resistant magnetic recording (HAMR), microwave assisted magnetic recording (MAMR), perpendicular magnetic recording (PMR), solid state drives (SSD), and the like devices used for storage of data.

An objective of the invention is to provide a high speed combo disintegrator for destruction of electronic devices using separate input chutes to safely disintegrate debris from SSDs and HDDs into a large collection bin.

Another objective of the invention is to provide an electronic destruction device with airborne particulate control to trap potentially harmful airborne particulates known to be released during the crushing of circuit boards, electronic components, and silicon based integrated circuit chips.

Still another objective of the invention is to provide an electronic destruction device with RFI and EMI Suppression to minimize interference with other nearby electronic equipment.

Yet another objective of the invention is to provide an electronic destruction device with a Combo noise level between 80 decibels (db) to 85 db; and idle is 70 db making it acceptable for workplace environments. The housing over the motors and shredder is insulated to keep noise levels beneath the 85 db level.

Another objective of the invention is to provide an electronic destruction device with a safety interlock to prevent operation if collection bin is not in place, ensuring the user never has to touch any potentially dangerous debris.

Another objective of the invention is to provide an apparatus wherein the cutting blades are an accessible and serviceable component. 1 Other objectives and advantages of this invention will become apparent from the following description taken in conjunction with any accompanying drawings wherein are set forth, by way of illustration and example, certain embodiments of this invention.

DETAILED DESCRIPTION OF THE INVENTION

Figure 1:
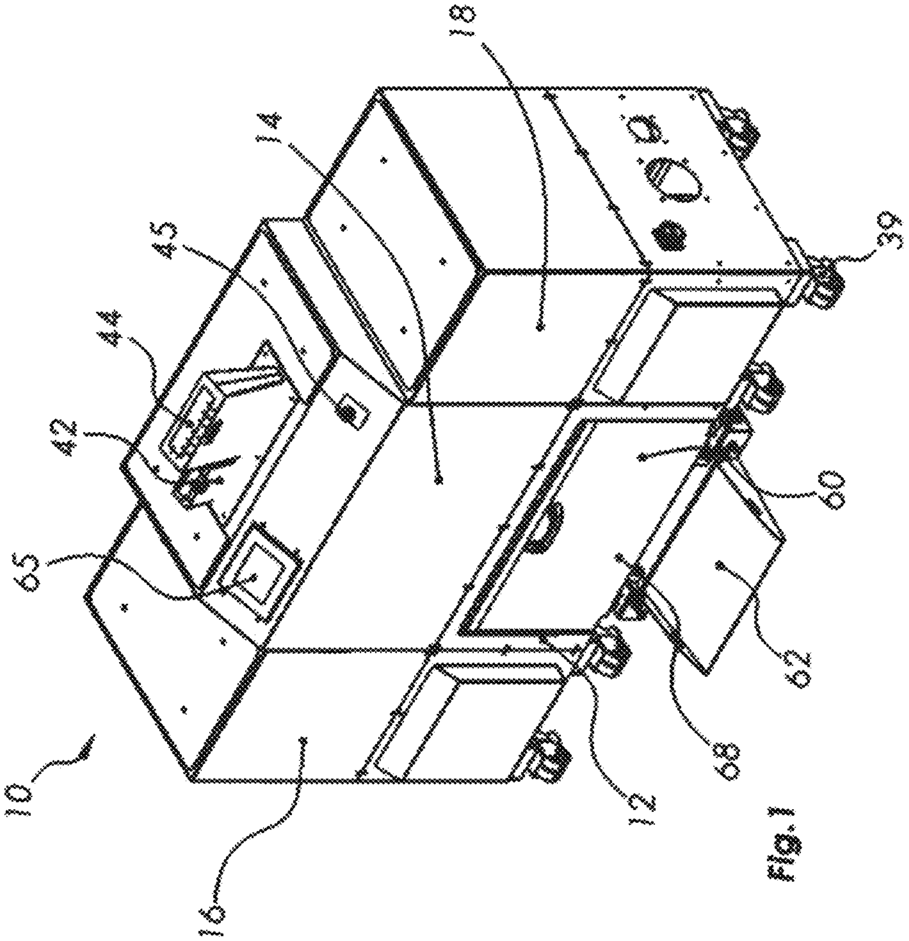
FIG. 1 is a perspective view of an electronic data disintegrator with insulation shields attached.
Figure 2:
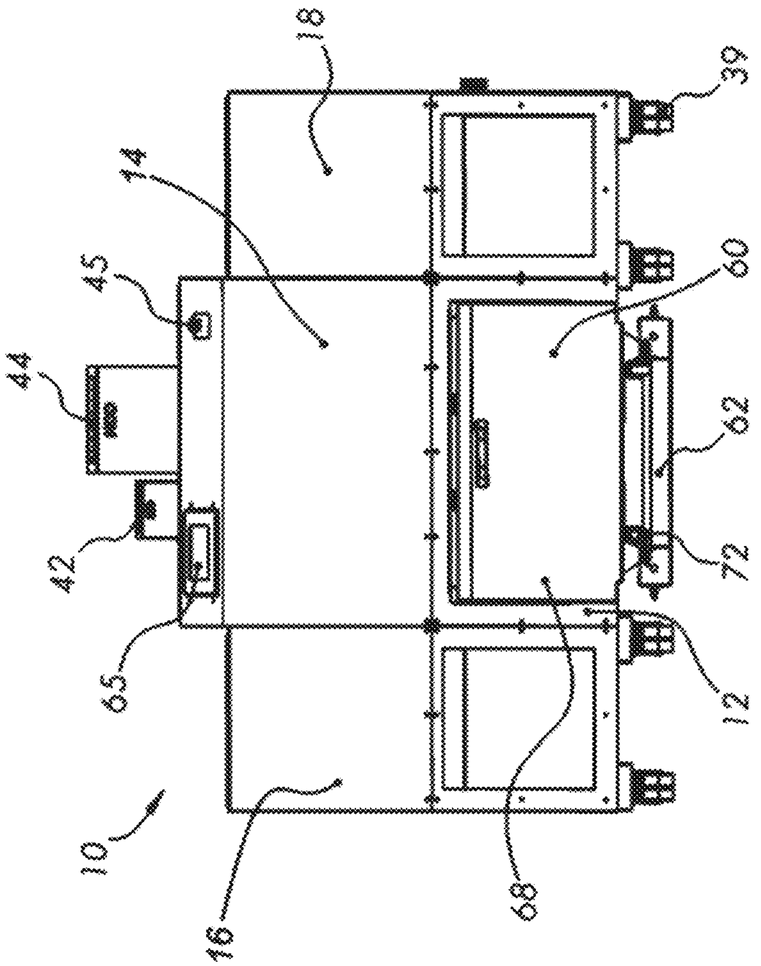
FIG. 2 is a front view thereof.
Figure 3:
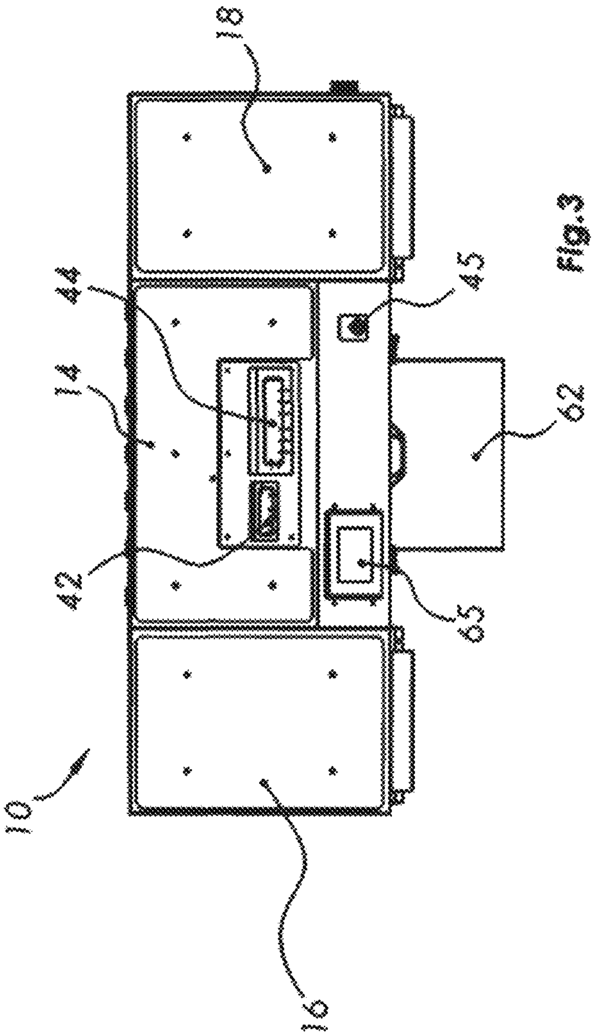
FIG. 3 is a top view thereof.
Figure 4:
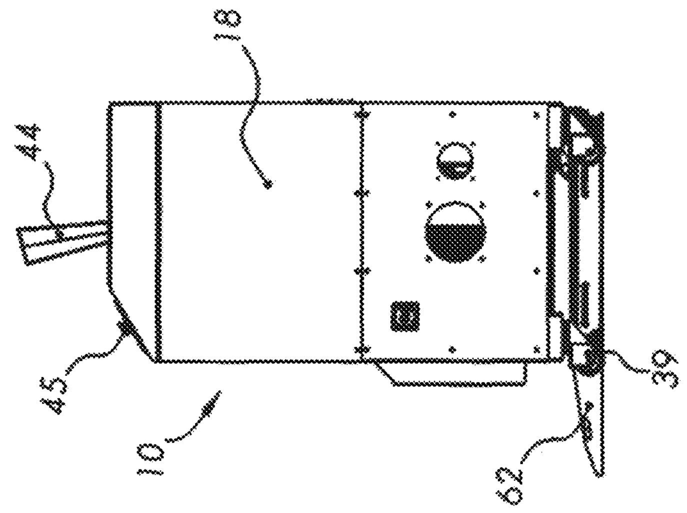
FIG. 4 is a side view thereof.
Figure 5:
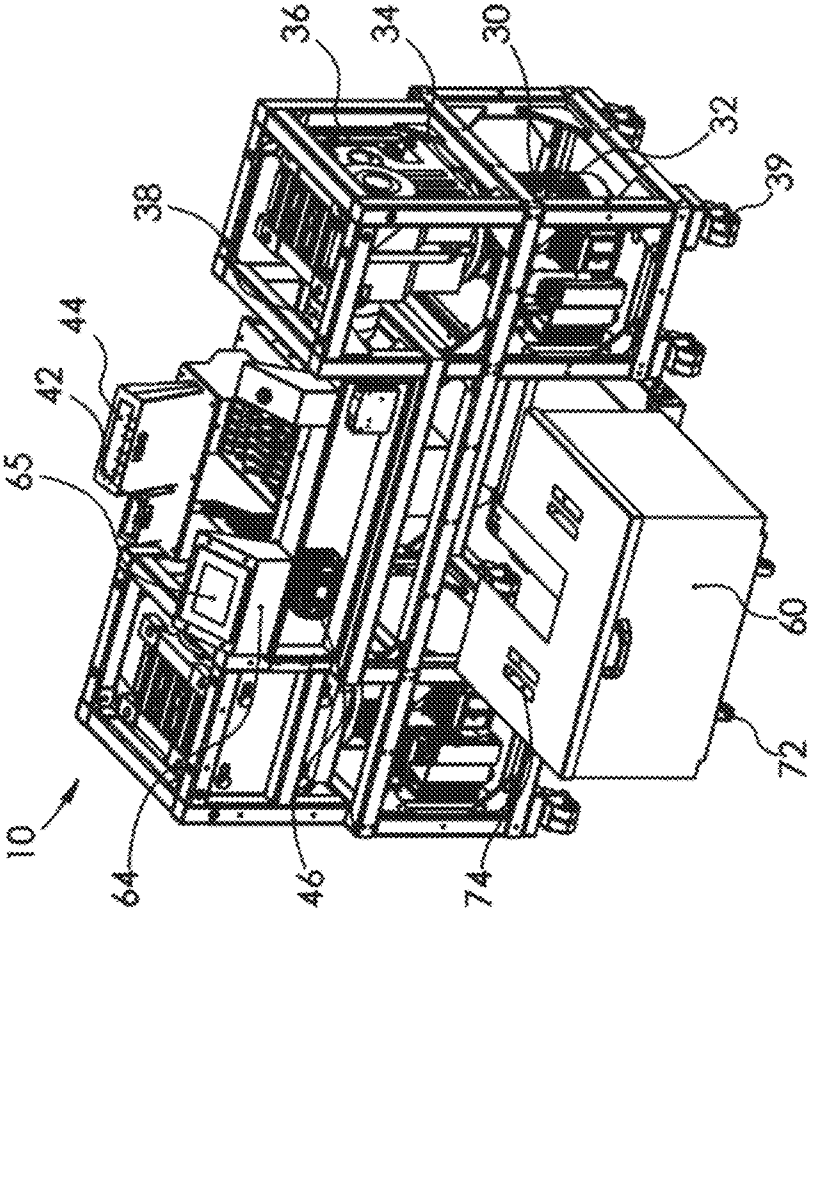
FIG. 5 is a perspective view of the electronic data disintegrator and a collection bin with the insulation shields removed.
Figure 6:
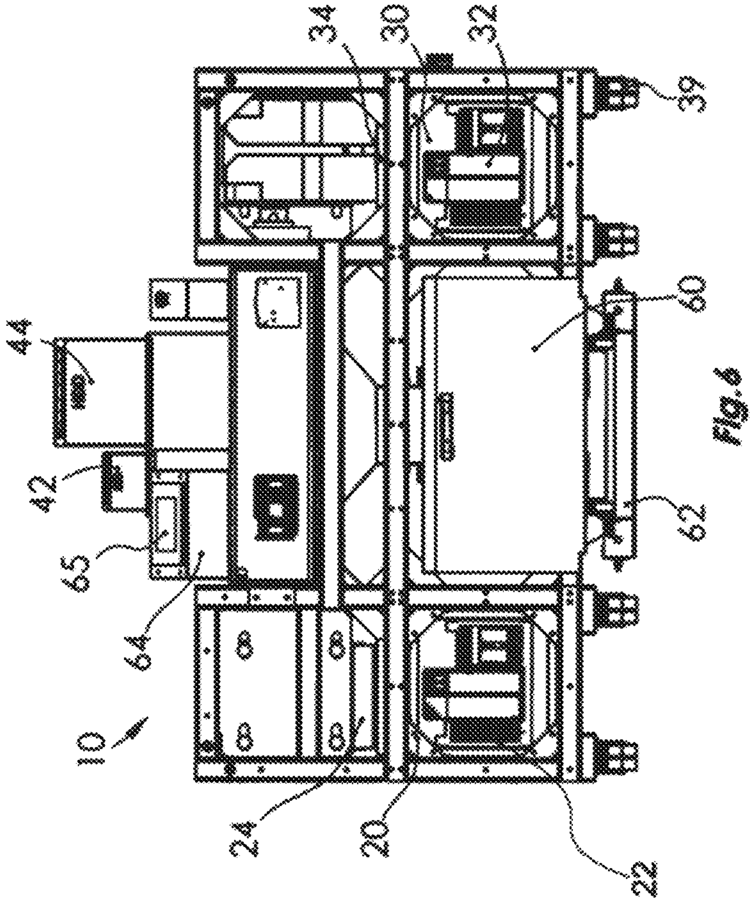
FIG. 6 is a front view thereof.
Figure 7:
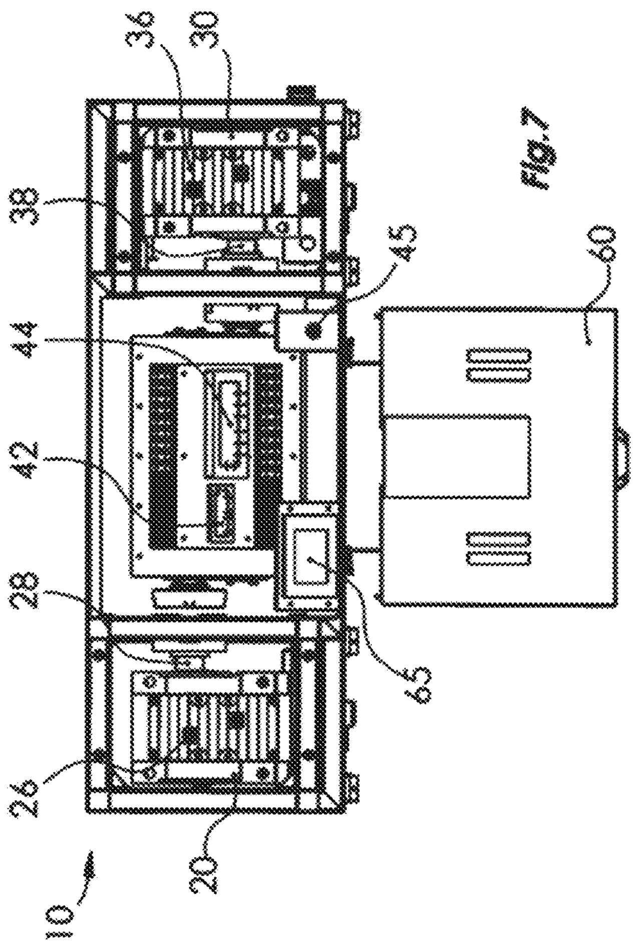
FIG. 7 is a top view thereof.
Figure 8:
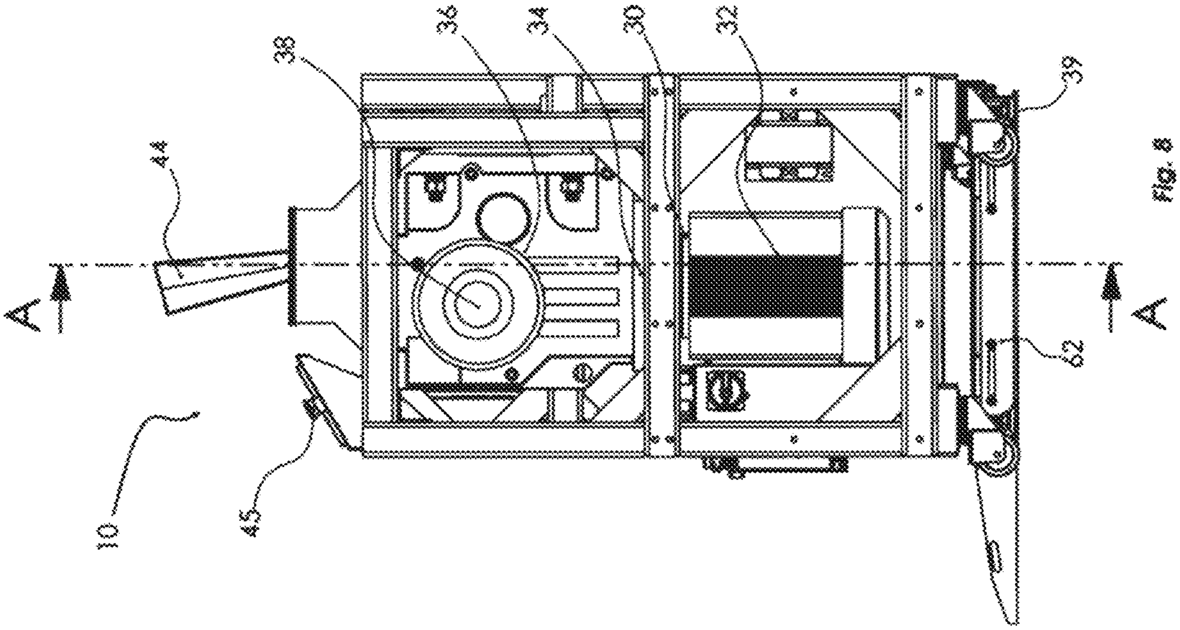
FIG. 8 is a side view thereof.
Figure 9:
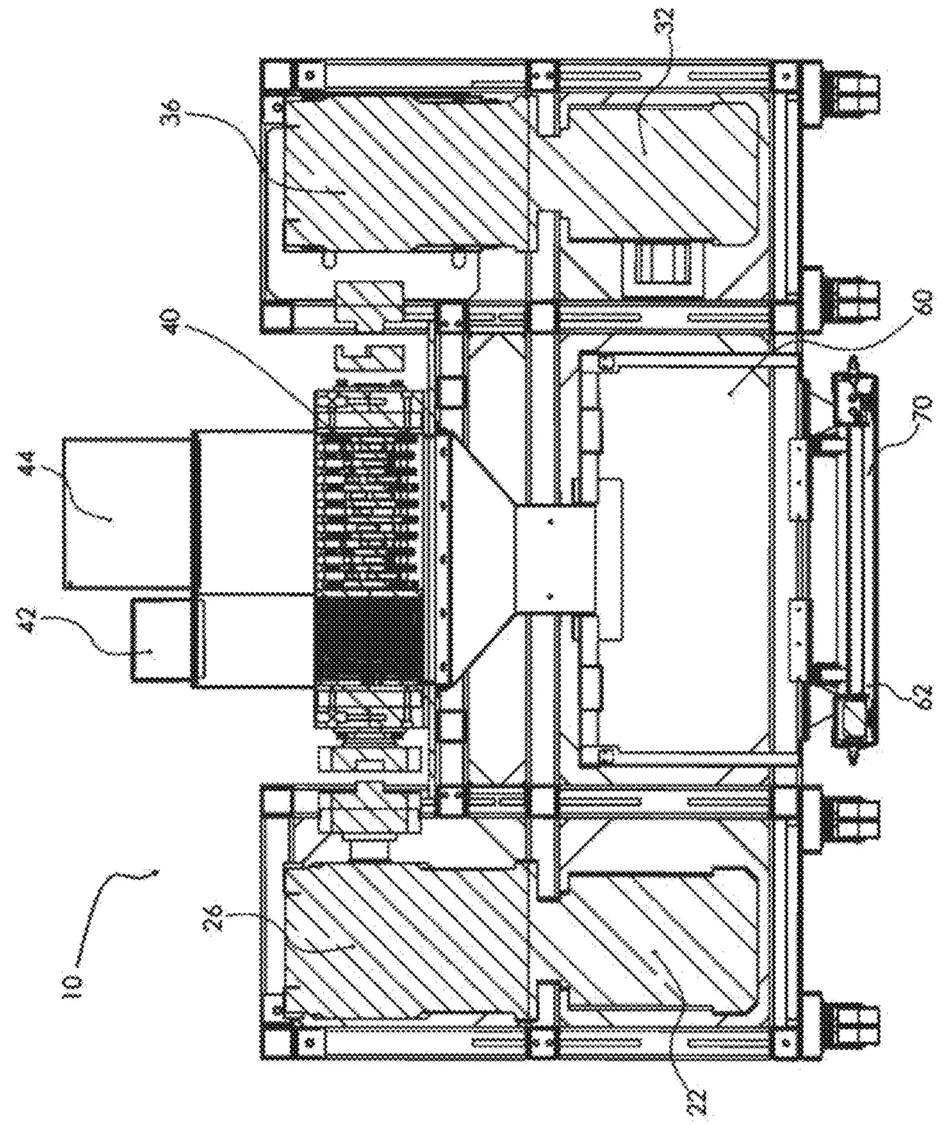
FIG. 9 is a cross sectional view taken along lines AA of FIG. 7.
Figure 10:
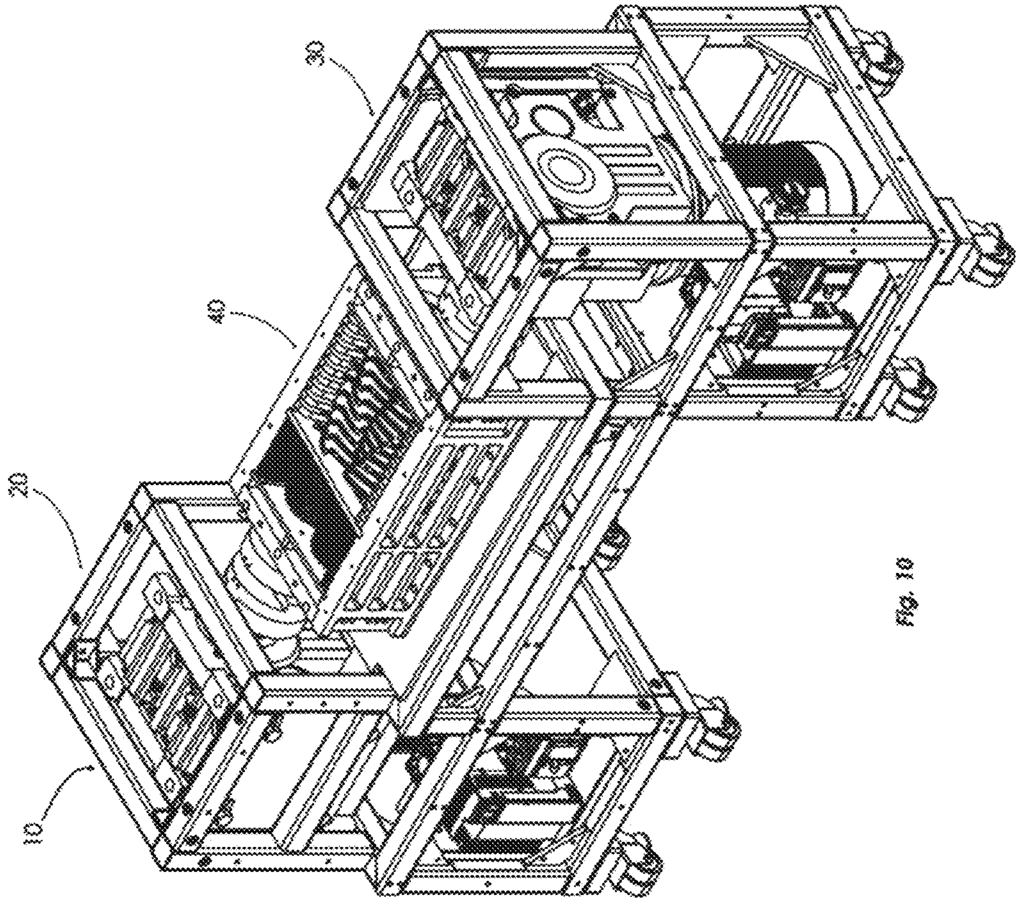
FIG. 10 is a perspective view of the electronic data disintegrator with the insulation shields, controller, and chutes removed.
Figure 11:
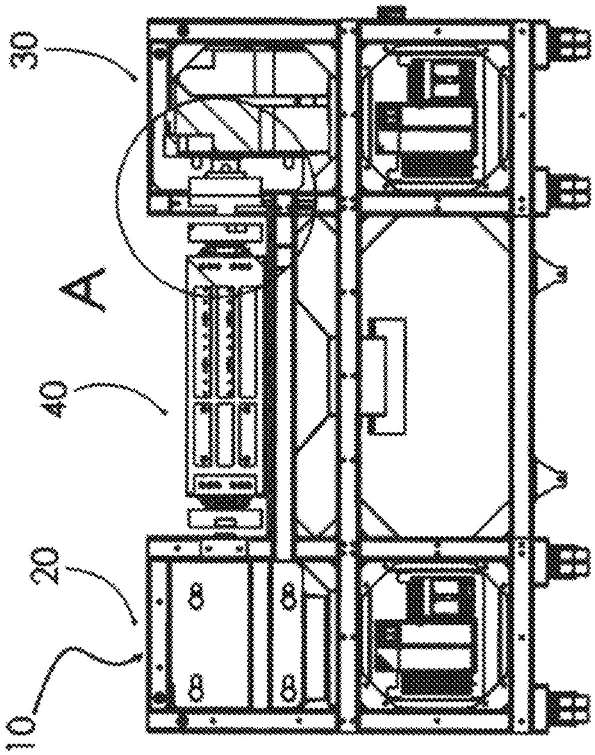
FIG. 11 is a rear view thereof.
Figure 12:
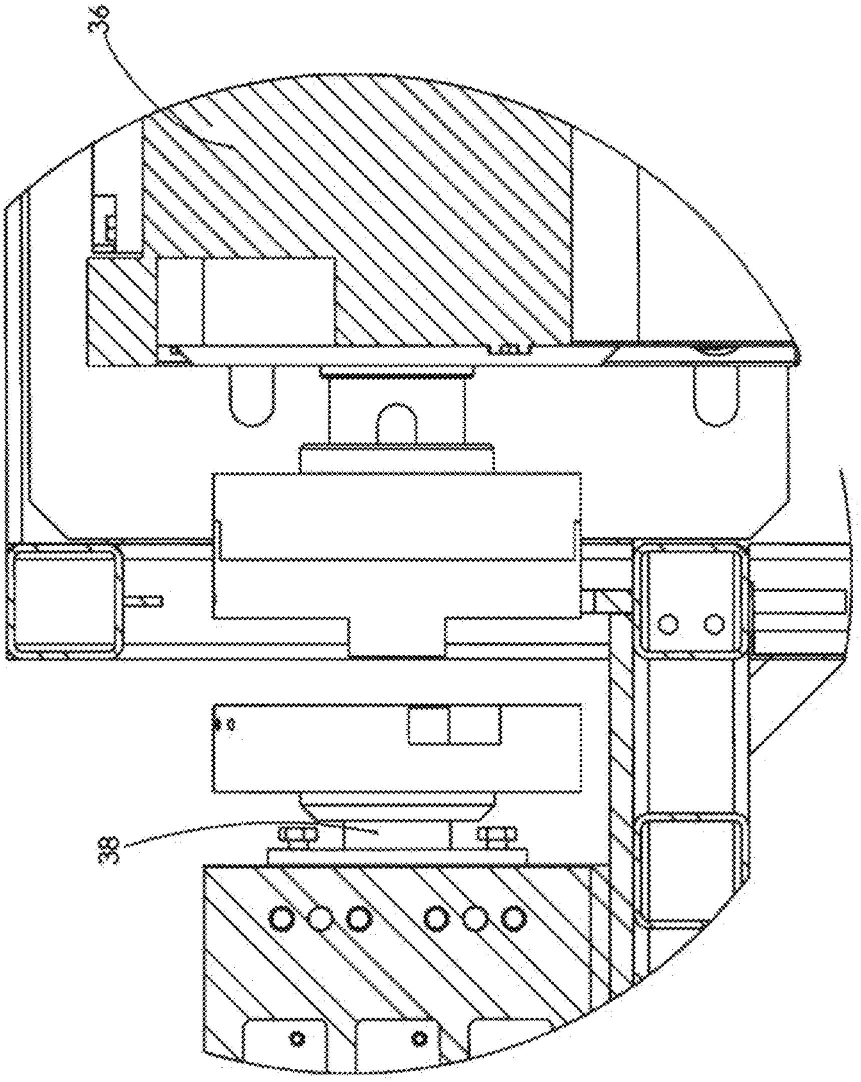
FIG. 12 is enlarged view of the coupling taken along section A displaying an area between a first blade shaft and a horizontally disposed drive shaft.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to the figures, an electronic data disintegrator 10 for high speed destruction of electronic data material is disclosed. The electronic data disintegrator 10 is specifically designed to destroy data on hard disk drives (HDD), heat resistant magnetic recording (HAMR), microwave assisted magnetic recording (MAMR), perpendicular magnetic recording (PMR), solid state drives (SSD), and the like devices used for storage of data. In particular, the instant invention employs dual input chutes, one designed for SSDs and the other for HDDs.

The electronic data disintegrator 10 includes a support frame 12 that is defined by a center section 14, a left motor section 16, and a right motor section 18. A first motor assembly 20 is mounted in the left motor section 16 and includes a first electric motor 22 positioned in a vertical orientation. The first electric motor 22 has a first vertical drive shaft 24 coupled to a first transmission 26 having a first horizontally disposed drive shaft 28. Similarly, the electronic data disintegrator 10 includes a second motor assembly 30 mounted in the right motor section 18 and includes a second electric motor 32 positioned in a vertical orientation. The second electric motor 32 has a second vertical drive shaft 34 coupled to a second transmission 36 having a second horizontally disposed drive shaft 38. In a preferred embodiment, the first electric motor 22 and the second electric motor 32 are two 7.5 kW gear motors. Further, the support frame 12 includes casters 39 for mobility with optional leveling feet and seismic tie-downs for stability, not shown.

Within the center section 14 is a shredder assembly 40 designed to grind HDDs and SSDs into particles for deposit. Above the shredder assembly 40 is a first designated chute 42 and a second designated chute 44, wherein the first designated chute 42 is sized 5"×1" (114 mm×18.5 mm) for SSDs and the second designated chute 44 is sized 11"×2" (274 mm×50 mm) for HDDs. The electronic data disintegrator 10 has a dual tandem entrance designed to handle HDDs and SSDs, making it ergonomically comfortable for users. In one embodiment, the device is equipped with a scanner 46 electronically coupled to a controller 64 to enhance media scanning and cataloging upon insertion. The device supports various media, including HDDs, SSDs, PCIe/NVMe devices, PDAs, SIM cards, smartphones, tablets, laptops, circuit boards, and USB drives. Further, media sanitization modality allows for a dual-opening device featuring single-stage destruction: One chute 44 is designed for hard media like HDDs, which are shredded into 20 mm strips, while the other chute 42 is for soft media like SSDs, reducing them to a nominal edge length of 5 mm or smaller. If shredding of the HDDs or SSDs causes a jam, the electronic data disintegrator 10 may automatically recover from the media jam or it may shut down if recovery is unsuccessful, allowing for manual unjamming. The electronic data disintegrator 10 will not operate if the safety interlocks 45 are not engaged, ensuring that hands or clothing cannot be accidentally caught in the moving parts.

Figure 15:
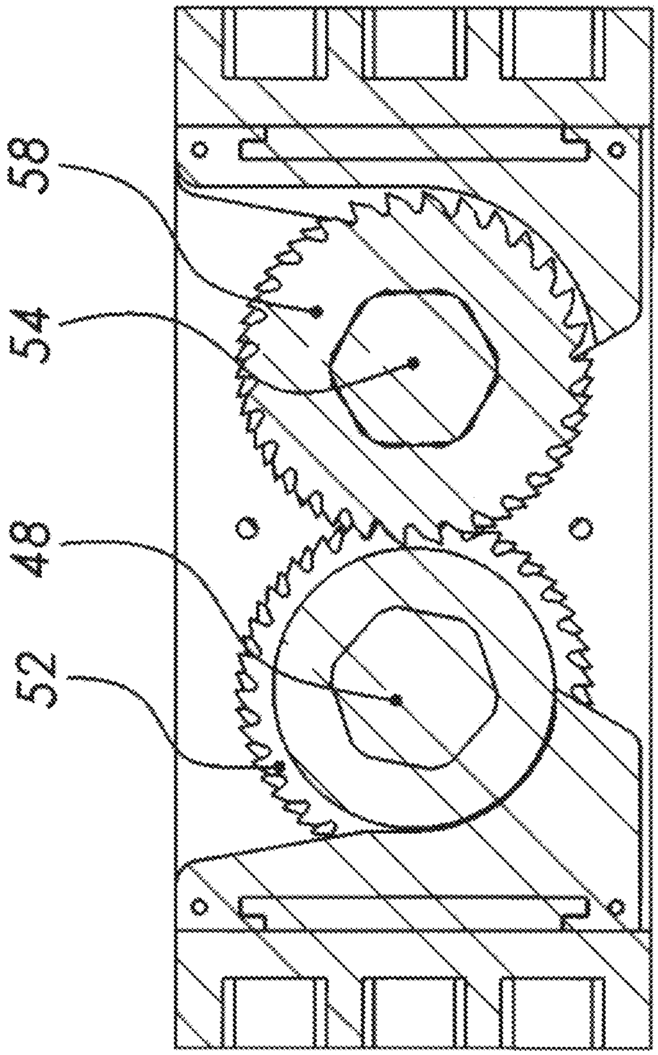
FIG. 15 is a cross sectional side view of the fine blades taken along lines AA of FIG. 14.
Figure 16:
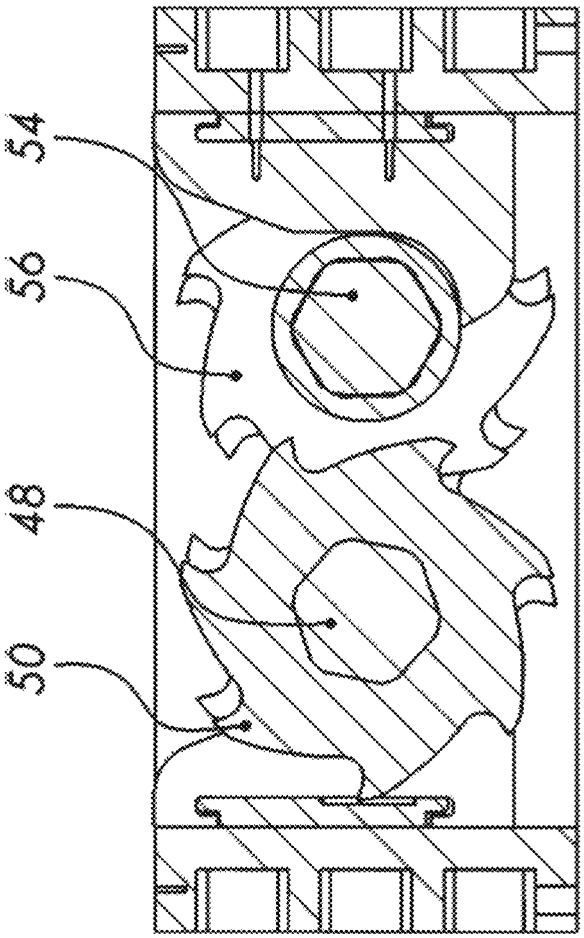
FIG. 16 is a cross sectional side view of the coarse blades taken along lines BB of FIG. 14.
Figure 17:
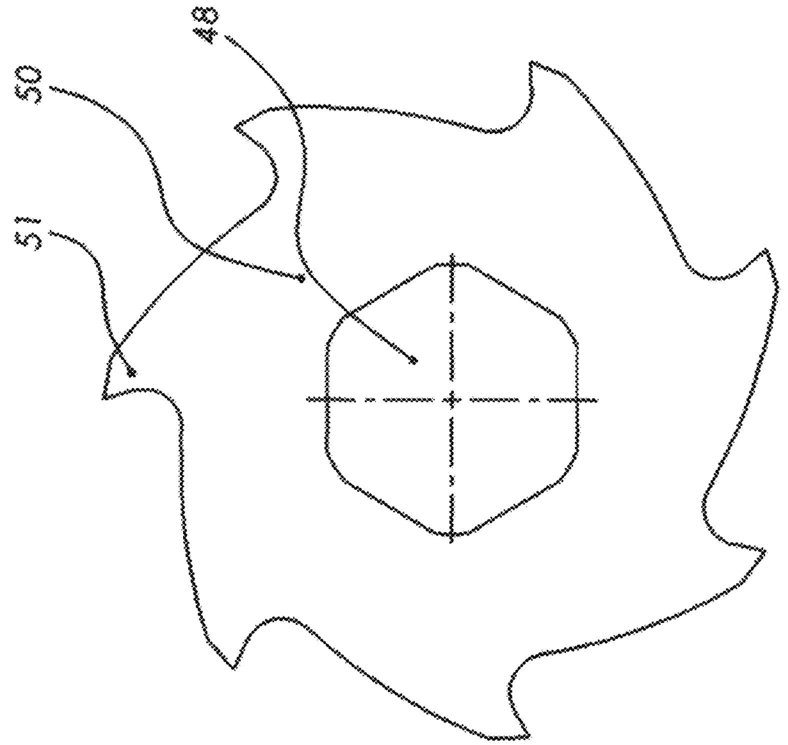
FIG. 17 is a side view of a coarse blade.
Figure 18:
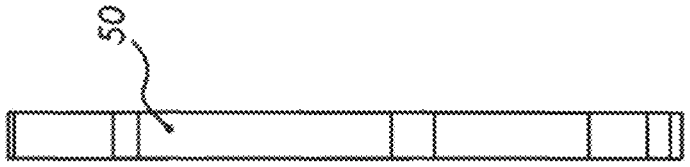
FIG. 18 is an end view of the coarse blade illustrated in FIG. 17.

The shredder assembly 40 includes a first blade shaft 48 coupled to the first horizontally disposed drive shaft 28, as shown in FIG. 15. The first blade shaft 48 holds a first set of spaced apart coarse blades 50 and a first set of spaced apart fine blades 52. Similarly, the shredder assembly 40 includes a second blade shaft 54 coupled to the second horizontally disposed drive shaft 38. The second blade shaft 54 holds a second set of spaced apart coarse blades 56 constructed and arranged to rotate within the first set of spaced apart coarse blades 50. The second blade shaft 54 also holds a second set of spaced apart fine blades 58 constructed and arranged to rotate within the first set of fine blades 52.

Figure 13:
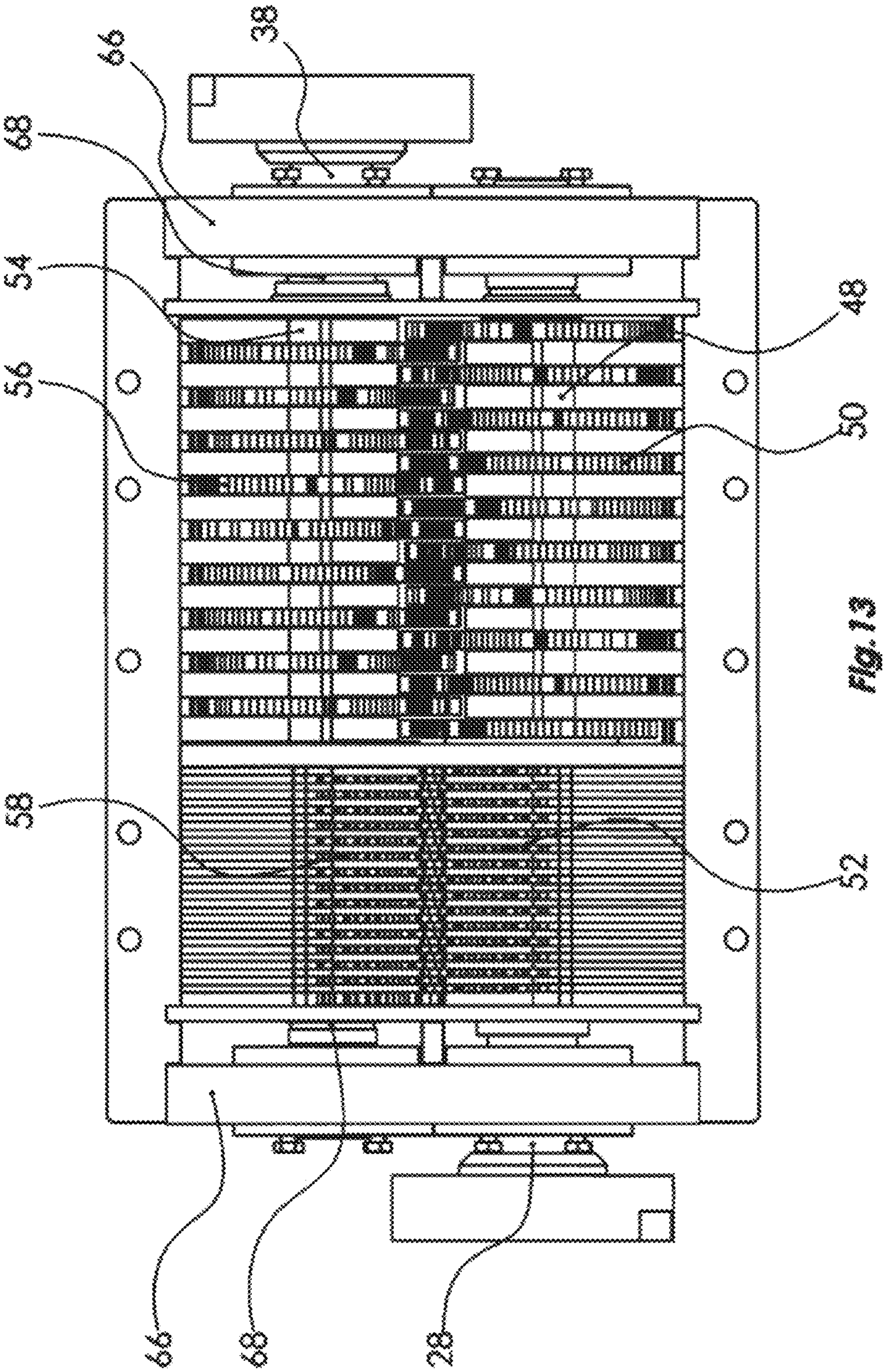
FIG. 13 is a top view of the shredder assembly.
Figure 14:
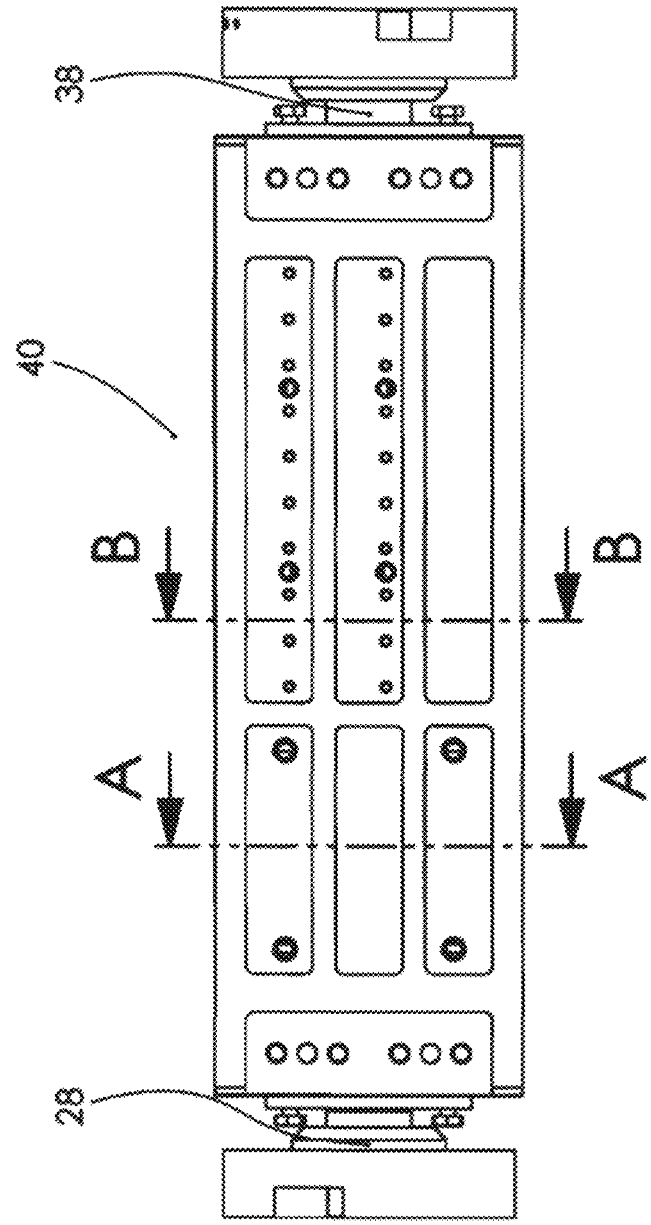
FIG. 14 is a front view thereof.

Each set of spaced apart blades 50, 52, 56, 58 includes a plurality of blades. In the exemplary embodiment, the first set of spaced apart coarse blades 50 and the second set of spaced apart coarse blades 56 includes nine coarse blades and the first set of spaced apart fine blades 52 and the second set of spaced apart fine blades 58 includes fifteen blades. Additionally, each coarse blade 50, 56 itself has seven tips 51. The shapes, size, and number of blades are not limited. As shown in FIG. 13, there is an overlap between the first set of spaced apart coarse blades 50 and the second set of spaced apart coarse blades 56 wherein the first set of spaced apart coarse blades 50 rotates counter-clockwise and the second set of coarse blades 56 rotates clockwise so that any HDD or SSD hard drive will be grinded into particle strips between each set of coarse blades 50, 56. This is likewise for each set of spaced apart fine blades 52, 58. Rotation of the course blades 50, 56 by the first 20 and second motor assembly 30 can grind standard HDDs into about 20 mm particle strips and grind 2.5" SSDs into about 5 mm particle strips.

The rotation of the coarse blades 50, 56 driven by the first motor assembly 20 and the second motor assembly 30 can grind about 1,000 standard 3.5" HDDs per hour and about 600 Enterprise 3.5" HDDs per hour. The rotation of the fine blades 52, 58 driven by the first motor assembly 20 and the second motor assembly 30 can grind about 7,200 standard 2.5" SSDs per hour and about 3,000 enterprise 2.5" SSDs per hour. The particles from the HDDs and SSDs fall into a collection bin 60 mounted in the center section 14 that is disposed beneath the shredder assembly 40. The collection bin 60 is positioned so that it can collect electronic data grind passed through the shredder assembly 40. A scale 62 may be positioned beneath the collection bin 60 that measures the weight of particles passed to the collection bin 60. The weight of which is then displayed on the controller 64 electronically coupled to the motor assemblies 20, 30 to control the operation thereof. The controller 64 itself is a programmable logic controller (PLC) providing security access, motor control, cycle count, and status via a touch screen 65.

An operator may set a threshold weight limit on the controller 64 to provide a visual and audible alarm of a filled collection bin 60 and disabling the first 22 and second motor 32 at a predetermined weight level, such as 150 lbs. or 250 lbs. (68 kgs. or 113 kgs.). The particles are then held in the collection bin 60 for later disposal. In a preferred embodiment, the collection bin 60 includes a bin lid 68 that is locked in a closed position when the collection bin 60 operates a pressure plate 70 when the collection bin 60 is properly placed on the scale 62. Further, the collection bin 60 includes casters 72 allowing for detachment from the support frame 12.

The grinding of a large number of HDDs and SSDs generates a large amount of heat, particles, and noise. A spacer 66 located at an end 68 of each blade shaft 48, 54 allows for heat dissipation of the shredder assembly 40. Additionally, the grinding of large amounts of HDDs and SSDs may cause particles to be released into the air. To ensure particles do not become airborne and to ensure the operator never has to deal with dangerous debris, the collection bin 60 includes HEPA filtration filters 74. To help reduce noise, the electronic data disintegrator 10 is constructed and arranged to operate at a noise level below 85 decibels.

1 All patents and publications mentioned in this specification are indicative of the levels of those skilled in the art to which the invention pertains. 1 The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

1 One skilled in the art will readily appreciate that the present invention is well adapted to carry out the objectives and obtain the ends and advantages mentioned, as well as those inherent therein. The embodiments described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An electronic data disintegrator for destruction of electronic data material comprising:

a support frame defined by a center section, a left motor section, and a right motor section;

a first motor assembly mounted in said left motor section, said first motor assembly positioning a first electric motor in a vertical orientation with a first vertical drive shaft coupled to a first transmission having a first horizontally disposed drive shaft;

second motor assembly mounted in said right motor section, said second motor assembly positioning a second electric motor in a vertical orientation with a second vertical drive shaft coupled to a second transmission having a second horizontally disposed drive shaft;

a shredder assembly having a first blade shaft coupled to said first horizontally disposed drive shaft, said first blade shaft holding a first set of spaced apart coarse blades and a first set of spaced apart fine blades; and a second blade shaft coupled to said second horizontally disposed drive shaft, said second blade shaft holding a second set of spaced apart coarse blades constructed and arranged to rotate within said first set of spaced apart coarse blades and a second set of spaced apart fine blades constructed and arranged to rotate within said first set of fine blades;

a collection bin slidably disposed beneath said shredder assembly, said collection bin positioned to collect electronic data grind passed through said shredder assembly; and a controller electrically coupled to said motor assemblies to control the operation thereof;

wherein rotation of said course blades by said first and second motor assembly can grind HDDs and SSDs into particles for deposit to be held in said collection bin for later disposal.

2. The electronic data disintegrator according to claim 1 wherein rotation of said course blades by said first and second motor assembly can grind standard HDDS into about 20 mm particle strips and grind 2.5" SSDs into about 5 mm particle strips.

3. The electronic data disintegrator according to claim 1 wherein said fine blades are fed SDDs from a first designated chute 5"×1" (114 mm×18.5 mm).

4. The electronic data disintegrator according to claim 1 wherein said coarse blades are fed HDDs from a second designated chute 11"×2" (274 mm×50 mm).

5. The electronic data disintegrator according to claim 1 including a scale positioned beneath said collection bin, said measuring the weight of particles passed to said collection bin, the weight of which is displayed on said controller.

6. The electronic data disintegrator according to claim 5 wherein said controller is programmable to detect a weight providing visual and audible alarms of a filled collection bin and disabling said first and second motor at a predetermined weight level.

7. The electronic data disintegrator according to claim 5 wherein said collection bin includes a bin lid that is locked in a closed position when said collection bin operates a pressure plate when said collection bin is properly placed on said scale.

8. The electronic data disintegrator according to claim 1 wherein an end of each said blade shaft includes a spacer to allow heat dissipation of said shredder assembly.

9. The electronic data disintegrator according to claim 1 wherein said controller is a programmable logic controller (PLC) providing security access, motor control, cycle count and status via a touch screen.

10. The electronic data disintegrator according to claim 1 including a scanner coupled to said controller, said scanner recording media insertion and cataloging.

11. The electronic data disintegrator according to claim 1 wherein rotation of said course blades by said first and second motor assembly can grind about standard 3.5" HDDs at a rate of 1,000 per hour and Enterprise 3.5" HDDs at a rate of 600 per hour.

12. The electronic data disintegrator according to claim 1 wherein rotation of said fine blades by said first and second motor assembly can grind standard 2.5" SSDs at a rate of about 7,200 per hour and Enterprise 2.5" SSDs at a rate of about 3,000 per hour.

13. The electronic data disintegrator according to claim 1 wherein said support frame includes casters for mobility.

14. The electronic data disintegrator according to claim 1 wherein said collection bin includes casters allowing for detachment from said support frame.

15. The electronic data disintegrator according to claim 1 wherein said collection bin includes HEPA filtration filters.

16. The electronic data disintegrator according to claim 1 wherein said disintegrator is constructed and arranged through insulation to operate at a noise level below 85 decibels.

17. The electronic data disintegrator according to claim 1 wherein said coarse blade has a tip with an 8 mm leading edge pitch set at 64 degrees leading to a 10 mm inwardly curved radius and a 145 mm outward curved radius leading to an adjoining tip.

18. The electronic data disintegrator according to claim 1 wherein said coarse blade has seven tips.

* * * * *